(12) United States Patent
McGillin et al.

(10) Patent No.: US 9,582,500 B2
(45) Date of Patent: Feb. 28, 2017

(54) RUN-TIME SQL LANGUAGE TRANSLATION

(71) Applicant: Oracle International Corporation, Redwood Shores, CA (US)

(72) Inventors: Barry McGillin, Northern Ireland (GB); Dermot O'neill, Swords (IE); Robert Pang, Palo Alto, CA (US); Chandrasekharan Iyer, Redwood City, CA (US); Kristopher Rice, Coarsegold, CA (US)

(73) Assignee: Oracle International Corporation, Redwood Shores, CA (US)

( * ) Notice: Subject to any disclaimer, the term of this patent is extended or adjusted under 35 U.S.C. 154(b) by 644 days.

(21) Appl. No.: 13/831,794

(22) Filed: Mar. 15, 2013

(65) Prior Publication Data
US 2014/0280259 A1    Sep. 18, 2014

(51) Int. Cl.
*G06F 17/30* (2006.01)
*G06F 17/28* (2006.01)

(52) U.S. Cl.
CPC .... *G06F 17/2863* (2013.01); *G06F 17/30427* (2013.01)

(58) Field of Classification Search
CPC .... G06F 17/28; G06F 17/2827; G06F 17/303; G06F 17/30436; G06F 17/30669; G06F 17/2863; G06F 17/30427
USPC ................................................ 707/756, 760
See application file for complete search history.

(56) References Cited

U.S. PATENT DOCUMENTS

| | | | |
|---|---|---|---|
| 5,721,904 A * | 2/1998 | Ito ..................... | G06F 17/30067 704/9 |
| 6,546,381 B1 * | 4/2003 | Subramanian .... | G06F 17/30463 |
| 2005/0149537 A1 * | 7/2005 | Balin .................. | G06F 17/303 |
| 2010/0185645 A1 * | 7/2010 | Pazdziora ......... | G06F 17/30389 707/760 |
| 2014/0208290 A1 | 7/2014 | McGillin | |

* cited by examiner

*Primary Examiner* — Evan Aspinwall
(74) *Attorney, Agent, or Firm* — Vista IP Law Group, LLP

(57) ABSTRACT

A method, system, and computer program product for database application migration. The method commences upon executing a foreign application, the foreign application emits SQL statements of a foreign SQL dialect that is incompatible with the SQL dialect of a native database system. The system configures a communication session to intercept the foreign SQL statements before the foreign SQL statements are received by the SQL parser of the native database system; and, while the foreign application is waiting for query results, the system translates the foreign dialect query statements into native SQL compatible with the native database system. The method further performs translating a return code from the native database system into a return code compatible with the foreign application. Configuring the database session connection comprises establishing a translation profile to translate foreign dialect SQL into native SQL, and to translate native SQL query return codes into foreign dialect return codes.

23 Claims, 10 Drawing Sheets

300

Query Language Translations

| Source Canonical Template | Target Canonical Template |
|---|---|
| SELECT TOP 10 * FROM TABLE1 | SELECT * FROM TABLE1 WHERE ROWNUM ≤ 10 |
| SELECT 'Hello Barry' | SELECT 'Hello Barry' FROM DUAL |
| Select TOP <ORA:LITERAL TYPE=INT ID=1> * FROM authors where name = <ORA:LITERAL TYPE=STRINGID=2> | SELECT * FROM authors WHERE NAME = <ORA:LITERAL TYPE=STRING ID=2> AND ROWNUM <= <ORA:LITERAL TYPE=INT ID=1>; |

Error Code Translations

| Native Error | Foreign Error |
|---|---|
| 1234 | 4321 |
| 5678 | 8765 |

FIG. 3

RUN-TIME SQL LANGUAGE TRANSLATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database application migration and more particularly to techniques for high-performance run-time SQL language translation.

BACKGROUND

The commercial importance of a high-performance and high-capacity database systems has resulted in a rapid proliferation of approaches by multiple vendors to supply high-performance and high-capacity database solutions. Over time, however, some of the plethora of approaches are amalgamated into fewer approaches. For example, users of multiple database systems in an enterprise may coalesce into fewer or even a single database system for ongoing operations. Or, one enterprise using a particular vendor's database system may be acquired and/or merged into another (e.g., larger) enterprise using a different vendor's database system. In many cases persistent data from one database system can be migrated into various forms of persistent data of another database system. Unfortunately, differing approaches by multiple vendors has resulted in a proliferation of dialects of SQL languages. Still, the strong need to coalesce multiple database systems into fewer or even a single database system for ongoing operations coupled with the very expensive and intractable technique of manual translation has precipitated vendor development of various techniques intended to facilitate coalescing activities.

In an environment having a source database with source applications (e.g., a foreign environment) that need to be coalesced into a target database (e.g., a native environment), several fully- or partially-automated techniques have been proposed and used singly and in combination, for example:
  Manually recompile the foreign applications under the native environment.
  Manually translate the foreign SQL language constructs into native SQL language constructs.
  Manually or semi-automatically translate the foreign database data itself into a corresponding native database.

Yet, the foregoing techniques cover only some of the possible origins of foreign SQL language statements. For example, foreign applications may assemble queries during run-time—such queries are available nowhere in complete form until run-time, so it cannot be known until run-time that there is such a query to be translated. Worse, legacy implementations cover only some of the possible constructs of foreign SQL language statements. Thus the legacy techniques to coalesce are in need of improvements, at least to provide fully- or partially-automated techniques for translating foreign SQL language statements into native SQL language statements (e.g., for translating foreign SQL into native SQL) regardless of the origin and regardless of the nature of the constructs of foreign SQL language statements.

Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for high-performance run-time SQL language translation.

The method commences upon executing a foreign application, where the foreign application emits SQL statements of a foreign SQL dialect that is incompatible with the SQL dialect of a native database system. The system configures a communication session to intercept the foreign SQL statements before the foreign SQL statements are received by the SQL parser of the native database system; and, while the foreign application is waiting for query results, the system translates the foreign dialect query statements into native SQL compatible with the native database system. The method further performs translating a return code from the native database system into a return code compatible with the foreign application. Configuring the database session connection comprises establishing a translation profile to translate foreign dialect SQL into native SQL, and to translate native SQL query return codes into the foreign dialect return codes.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3 exemplifies a look-up table used in systems for high-performance run-time SQL language translation, according to some embodiments.

DETAILED DESCRIPTION

Figure 1A:
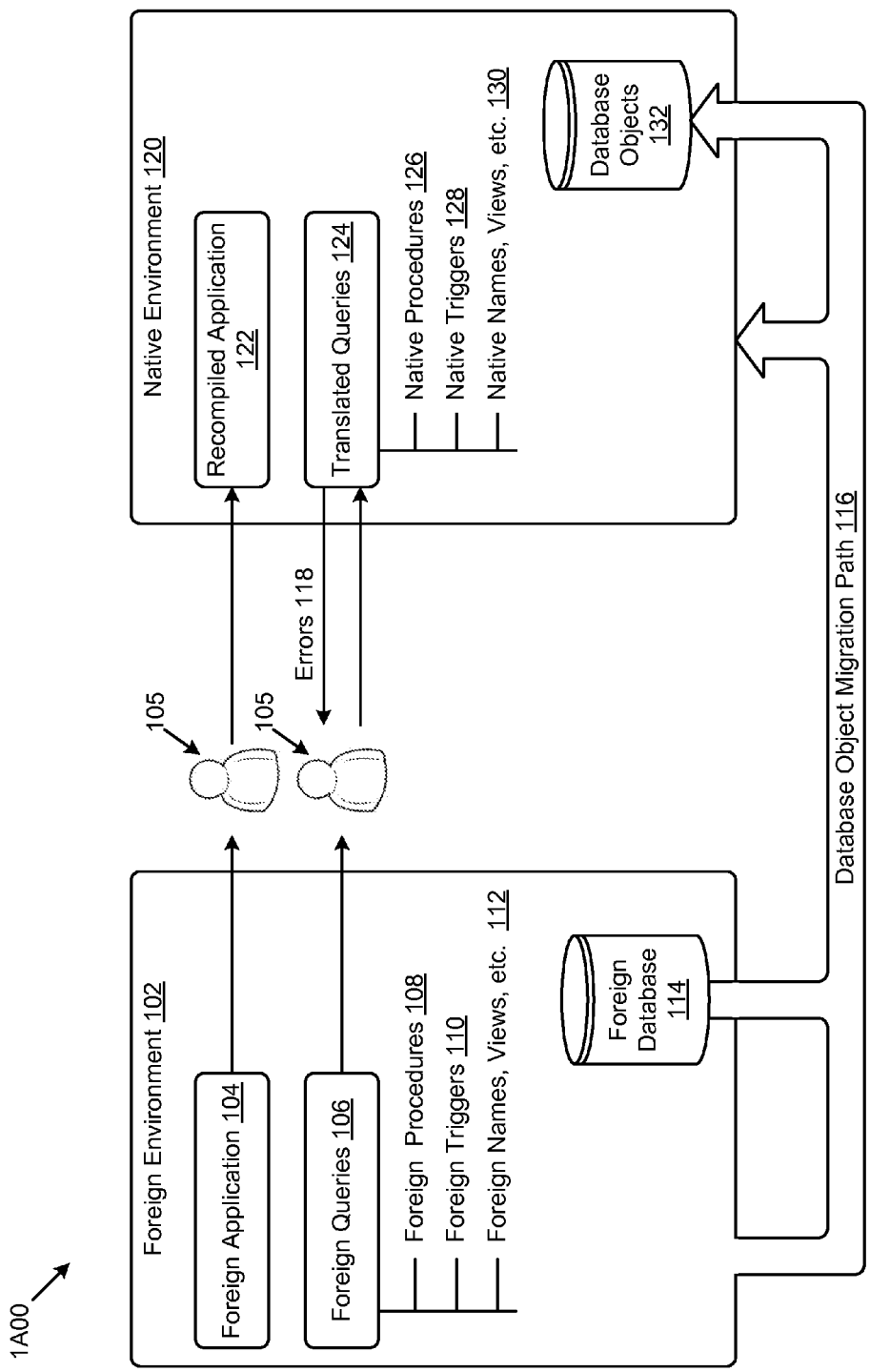
FIG. 1A exemplifies a flow for migration of selected database objects in a system for high-performance run-time SQL language translation, according to some embodiments.

Some embodiments of the present disclosure address the problem of high-performance run-time SQL language translation and some embodiments are directed to specific architectures of systems for implementing high-performance run-time SQL language translation.

OVERVIEW

Consider the issues involved to migrate a foreign database and application to a native environment. In addition to migrating the database data itself, other aspects of the foreign environment need to be addressed, and possibly moved or migrated or translated to the native environment. In particular, SQL language constructs stored and/or used and/or emitted by the foreign application code needs to be dealt with.

Migrating the SQL language constructs stored and/or used and/or emitted by the foreign application code applications from foreign (or any non-native database) to a native environment has proven to be difficult inasmuch as each foreign database vendor implements their own SQL language or dialect. An encompassing solution to the foregoing problems has several facets to be addressed:

Handling dynamically-generated query constructs. When migrating an application built to run against a foreign environment to in a native environment, all the foreign SQL language constructs in the application code needs to be translated to a dialect suitable to operate within the native environment. This can be partially addressed when the foreign query constructs are statically-constructed into statements in a file (e.g., for storing complete query statements). However in many situations, the queries tend to be dynamically-constructed within the foreign application logic (e.g., within a Java method) and then sent to the database using some form of a database connection. Thus, such dynamically-generated SQL language statements might never be persistently stored, and in fact, such dynamically-generated SQL language statements might not be generated until run-time. Still worse, such dynamically-generated SQL language statements might not be generated until run-time, and then on the basis of values available only at that moment in the run time. Accordingly, some techniques employ a translation profile set on the application connection (further discussed below) to facilitate the real-time receipt and translation of incoming SQL language constructs into native database SQL language constructs.

Addressing Performance. Even given an implementation of a connection and the setting of a translation profile as in the foregoing, this places real-time demands on the native database system. For example, automated translation of incoming query constructs might consume several seconds of real-time. One approach (further discussed below) is to populate a look-up table or translation cache comprising incoming/translated query constructs, and use the look-up table or translation cache so as to eliminate or reduce repeated/redundant translation of previously seen incoming query constructs. Such a look-up table and/or translation cache can be used for across a wide range of incoming query constructs, including statically-generated query constructs, dynamically-generated query constructs, and including value-dependent query constructs such as are further discussed herein.

Handling value-dependent query constructs. In illustrative cases, a query statement may contain a literal or hard-coded value, and the infinite range of possibilities of unique values of literals in query statements could result in a look-up table of infinite size. Strictly to illustrate, consider these SQL language statements:

SELECT*FROM authors where name='Barry'
SELECT*FROM authors where name='Dermot'
SELECT*FROM authors where name='Robert'
SELECT*FROM authors where name='Iyer'

The foregoing examples are examples of literal strings, however literals can come in the form of 'hard-coded' numbers as well.

Of course, addressing the performance issues using a (theoretically) infinitely-sized look-up table would tend to reduce the performance gains possible. Thus, in order to eliminate or reduce repeated/redundant translations of previously seen incoming query constructs—even in the case of value-dependent query constructs—the technique of canonical templating is disclosed. The technique of canonical templating performs pattern matching on portions of a query (e.g., excluding the literals) in order to reduce the theoretically infinite number of value-dependent query constructs to a much smaller number of patterns. The much smaller number of patterns is matched and the actual literal values are substituted back in during a later operation.

Table 1 gives one possible mapping of the problems and solution techniques addressed in this disclosure.

TABLE 1

| Mappings | |
|---|---|
| Problem | Techniques |
| Handling dynamically-generated query constructs | Connection, Set Translation profile, run-time translation of incoming query constructs |
| Addressing performance of automatic translation | Real-time translation of incoming query constructs in combination with a look-up table |
| Handling value-dependent query constructs | Look-up tables populated with canonical representations of value-dependent query expressions |

The techniques of Table 1 are discussed below, and various architectures for implementing the aforementioned are also provided in the herein-disclosed figures and discussions.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A exemplifies a flow 1A00 for migration of selected database objects in a system for high-performance run-time SQL language translation. As an option, the present flow 1A00 may be implemented in the context of the architecture and functionality of the embodiments described herein. Also, the flow 1A00 or any aspect therein may be implemented in any desired environment.

The shown flow 1A00 and migration paths rely on significant manual effort. The disclosure herein-above and below reduces or eliminates such manual effort. Still, the flow 1A00 exemplifies migration from a foreign environment (e.g., a Sybase environment) to a native environment (e.g., an Oracle environment). In the flow shown, the foreign application 104 is manually retargeted as a recompiled application 122 in the native environment. This technique is possible, and in some cases desired (see FIG. 2), yet there are flow alternatives that offer earlier migration results sooner and with higher confidence.

Turning attention to the bottom left of FIG. 1A, a foreign database 114 from the foreign environment 102 is migrated to the native environment 120 in the form of database objects 132. The database object can be stored in a relational database, or in files, or in a registry or directory or any other form of persistent storage. The path shown at the bottom of FIG. 1A depicts a database object migration path 116, which database object migration path 116 supports human-aided migration of foreign queries at least by a manual translation of foreign queries 106 to translated queries 124, using manual translation by a user 105. The user might interact with the native environment in order to manually translate queries, procedures, triggers, names, views and so on. In the manual process of translating foreign procedures 108 to native procedures 126, and in translating foreign triggers 110 into native triggers 128, and in translating foreign names 112, foreign views, etc. into native names 130, native views, etc. various errors might be emitted from within the native environment, and such errors 118 can be considered by the user. The user might avail the use of some point tools (e.g., lists, spreadsheets, XML schema, etc.) to aid in the manual translation process.

Improvements can be made to the flow 1A00 such that the degree of manual intervention is reduced or eliminated, for example, by facilitating the automatic translation of query statements as received in real-time. Some of such improvements are depicted in the improved flow of FIG. 1B.

Figure 1B:
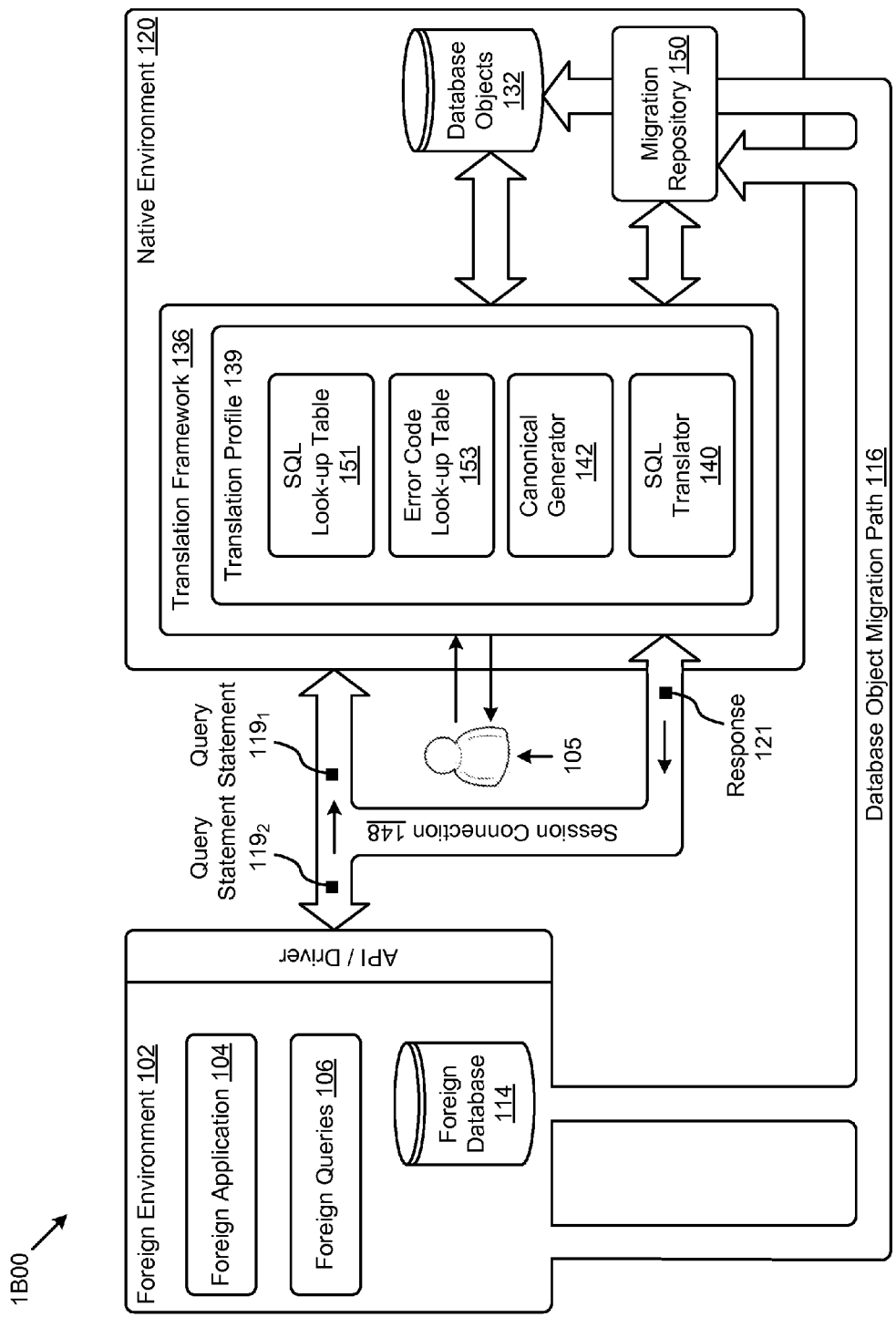
FIG. 1B depicts communication paths between a foreign environment and a native environment when using an improved flow for migration of selected database objects in a system using high-performance run-time SQL language translation, according to some embodiments.

FIG. 1B depicts communication paths between a foreign environment and a native environment when using an improved flow 1B00 for migration of selected database objects in a system using high-performance run-time SQL language translation. As an option, the present improved flow 1B00 may be implemented in the context of the architecture and functionality of the embodiments described herein. Also, the improved flow 1B00 or any aspect therein may be implemented in any desired environment.

Figure 1C:
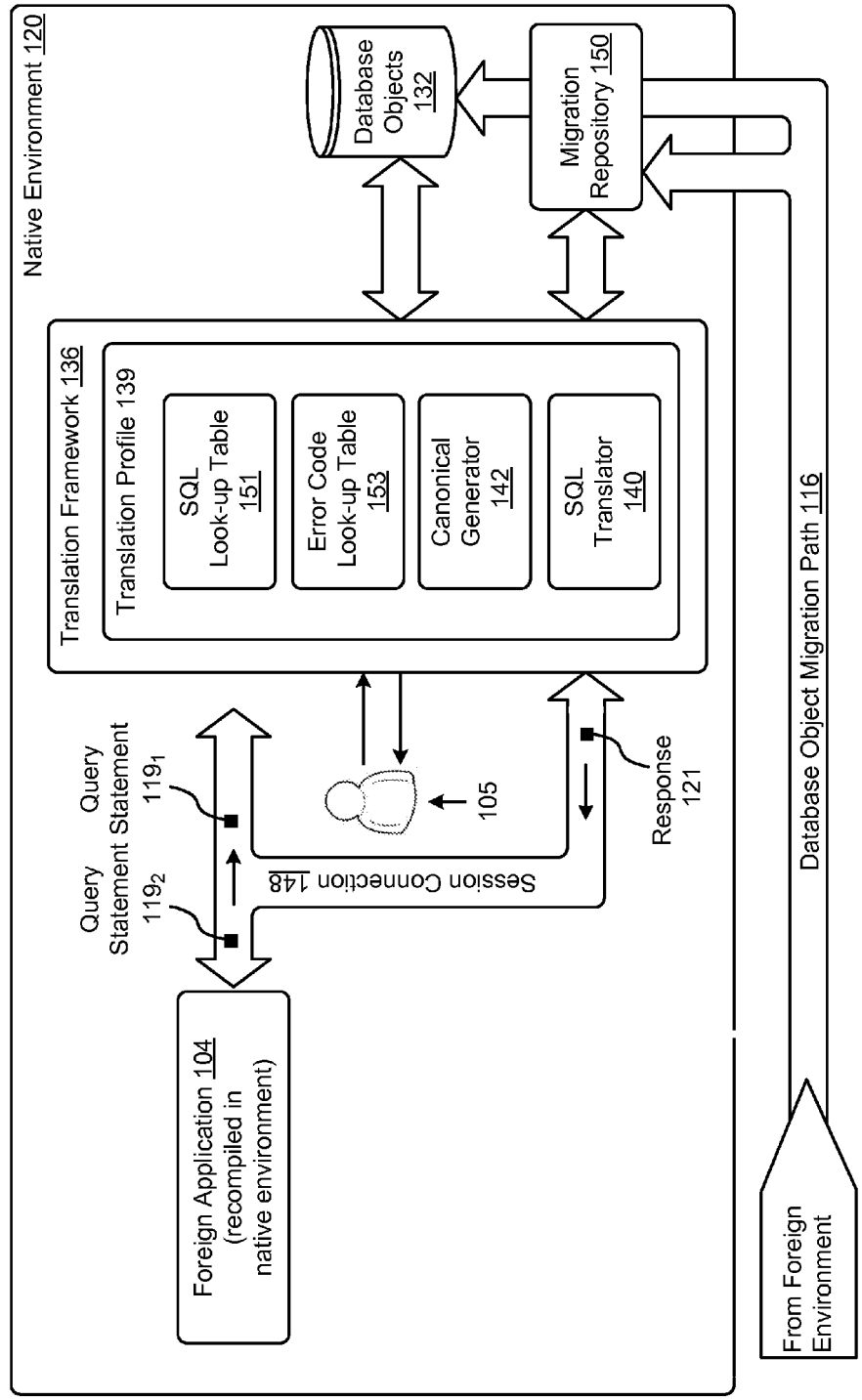
FIG. 1C is a block diagram depicting a foreign application (recompiled in the native environment) for high-performance run-time SQL language translation, according to some embodiments.

FIG. 1B illustrates a system for running a foreign application in its corresponding foreign environment (e.g., compilers, APIs, etc.) and establishes an understanding of inter- and intra-operation by and between a foreign environment and a native environment. FIG. 1C distinguishes over FIG. 1B to illustrate an environment for running a foreign application in a recompiled form.

The block diagram of FIG. 1B depicts elements of a performant data flow between a foreign environment and a native environment. In particular, the block diagram shows that each of the problems given in Table 1 are addressed using the techniques of Table 1 within the structures as shown in FIG. 1B.

In addition, to address the problems given in Table 1 within the structures as shown in FIG. 1B, the path shown at the bottom of FIG. 1B depicts a database object migration path 116 that supports fully-automated or partially-automated migration of a range of database objects. Any and all aspects of the shown database object migration can be codified and stored in a migration repository 150, which can be accessed by any module or process within the native environment.

Handling Dynamically-Generated Query Constructs

Some embodiments serve to automatically convert database procedures, triggers and views, and to manage most forms of query construct translation. Yet, demands by certain database applications for low-latency interaction between foreign applications (e.g., one or more applications in a foreign environment) and the native database environment provides the motivation for higher- and still higher-performing translation techniques.

The shown embodiment manages the query construct translation (e.g., SQL conversion) within the native environment. In real-time, as it receives complete query statements via the session connection 148, the translation framework 136 routes the complete query statements (e.g., query statement $119_1$, query statement $119_2$, etc.) to a Translation Profile 139, which in turn intercepts foreign SQL statements (e.g., before the foreign SQL statements are received by an SQL parser of the native database system) and routes portions of the query statements as needed to a canonical generator 142.

The Translation Profile 139 includes a statement recognition facility, and the automatic translator (e.g., SQL translator 140) translates most, but not necessarily all, received foreign query statements into native statements. The facilities of the translation framework are sometimes augmented by user input (e.g., input by a client, by customer personnel, by a consultant, by an application engineer, etc.), possibly in the form of:

An a priori defined conversions from a foreign construct into a native construct, possibly implemented as part of a translation profile 139.

A manually edited version of an automatic translation conversion, possibly implemented as part of a translation profile 139.

Thus, as can now be seen, the translation framework intercepts query statements that were originally intended for the foreign database, and translates them for use in accessing any instances of database objects 132 within the native environment. The query statements that were originally intended for the foreign database may have originated from foreign static queries, or may have been dynamically-constructed within the foreign application logic. In any case the session connection can be configured (e.g., by setting a translation profile 139 on the connection) such that any and all query statements that were originally intended for the foreign database 114 are received by the native environment 120 via the session connection 148 and delivered to the appropriate components within the translation framework to be translated in real-time as received.

In most cases, the foreign application issues a SQL statement, and then waits for the result set or other response to the SQL statement. In the case that the SQL statement is translated and operated upon within the native environment as shown in FIG. 1B, the foreign application would wait for a result set or other response to the SQL statement (e.g., response 121) via the session connection. In some cases the response 121 is in the form of an error. There are various types of errors, many of which are addressed in the disclosures herein.

Addressing Performance of Automatic Translation Using a Look-Up Table

The native environment 120 includes a look-up table (e.g. SQL look-up table 151) for fast translation of previously translated constructs using previously validated (e.g., known correct) translations. Specifically, a translation of a particular construct would need only to be performed once (e.g., upon recognition of a first occurrence of the construct). Performing such a translation, then validating it using any of the herein-disclosed means, and storing the translation in a look-up table facilitates real-time translation. For subsequent occurrences of the same query statement, the conversion could be looked up with great alacrity. The availability of a look-up table allows a user to inspect the translation look-up table, and possibly modify the dialect of translated query constructs. The particular dialect of translated query constructs may vary as a function of the operation of the foreign application or as a function of the specific vendor or type or instance of the foreign environment.

Handling Value-Dependent Query Constructs

Sometimes, applications draw from a finite set of SQL statements and SQL fragments, which when processed at run time can dynamically generate a much larger set of unique SQL Statements to run against the database. Yet, as earlier indicated, applications deployed in an enterprise setting can comprise an infinite range of query expressions, at least since they may involve an infinite range of literal values. SQL language (e.g., SQL) from applications tends to be dynamic and perpetually changing such that unique query statements in need of translation occur frequently. Yet, translating each unique SQL statement as it arrives in the database, may impact or even preclude use in a production setting—and using a lookup table for prior translations is not fully-effective as there is a strong likelihood that new incoming SQL statements will have different literal values, and therefore the exact SQL statement might not have been earlier translated.

Given the observed frequency of occurrence of such new query statements in need of translation, static methods and/or other methods that rely solely on a priori translation do not perform optimally. Moreover, queries can comprise literals, and the range of possibilities of query constructs comprising literals gives rise to a potentially infinite range of query expressions. This phenomenon would predict that a high rate of occurrence of new, never-before recognized query constructs that would need to become the subject of automatic translation (since they would not be in the look-up table). Thus, the occurrence of value-dependent query constructs has at least the potential to be deleterious to performance.

For example, (1) if a translator module such as a canonical generator 142 were implemented to recognize portions of, or repeating patterns within, SQL language statements that contain the literals, and (2) if a mapping facility (e.g., a look-up table) were implemented to define what the conversion of the portions of, or repeating pattern should be, then only the portions/patterns would need be translated, and the literal value or reference could be inserted into the translated pattern in a subsequent step. The insertion can be via mere textual re-injection, or by use of redirection. Consider the following example of a source query expression containing a literal, a replacement canonical template, and a mapping of a literal to a value. Table 2 gives one possible mapping facility for literals.

TABLE 2

| Literal Mapping | |
|---|---|
| Construct | Example |
| Source SQL Statement | "SELECT TOP 10 * FROM authors where name='FRED'" |
| Replacement Canonical Template | SELECT TOP <ORA:LITERAL TYPE=INT ID=1> * FROM authors where name = <ORA:LITERAL TYPE=STRING ID=2> |
| Source Literals Map | 1. 10<br>2. 'FRED' |

This source canonical template could be matched against all the SQL statements following the same pattern, even if there are different literal values to be substituted in at a later time in the translation process. In this case, the expression "<ORA:LITERAL TYPE=INT ID=1>" is resolved to the value "10" and the expression "<ORA:LITERAL TYPE=STRING ID=2>" is resolved to the value "FRED" when the replacement canonical template is resolved.

Of course the foregoing is but one example, and any form or forms or patterns of any portion of a query statement can be looked up in a look-up table. Further discussion of other forms or patterns of portions of query statements are disclosed in the discussions pertaining to FIG. 3.

Persisting the SQL statement in its canonical format (e.g., using a Source Canonical Template, or key) and its translation in canonical format (e.g., using a Target Canonical Template, or value), into the SQL Look-up table, allows prior translations to be stored, and effectively used for translating new unique SQL Statements, even with different literal values. Canonicalization of the source SQL statement into a Source Canonical Template and literal map, looking up prior translations of the Source Canonical Template in a SQL Look-up Table and applying the literal map against the Target Canonical Template, generating the Target SQL, performs better than merely using the automatic translation absent Canonicalization of the source SQL to the target SQL. In addition to the aforementioned performance characteristics Canonicalization of the source SQL statement into a Source Canonical Template facilitates user review and modification of the translation, and the user might even specify the Target Canonical Template (translation).

Having the facilities of the foreign environment 102 together with the facilities of the native environment 120, and with the communication between, it is possible to define a candidate step-wise flow (see FIG. 2) for carrying out a migration using a combination of migration techniques and translation techniques. Yet, still further improvements emerge when the foreign environment is deprecated, and the foreign application is recompiled in the native environment, as discussed just below.

FIG. 1C is a block diagram 1C00 depicting a foreign application (recompiled in the native environment) for high-performance run-time SQL language translation. As an option, the block diagram 1C00 may be implemented in the context of the architecture and functionality of the embodiments described herein. Also, the block diagram 1C00 or any aspect therein may be implemented in any desired environment.

The block diagram distinguishes over the system of FIG. 1B at least in that the foreign application is recompiled within the native environment. The session connection is configured to carry query statements 119, and response 121. Further the possible disposition of the foreign application in a recompiled form within the native environment has at least the potential to further reduce latency in operation, as well as to reduce the burden of ongoing maintenance of the foreign environment.

Figure 2:
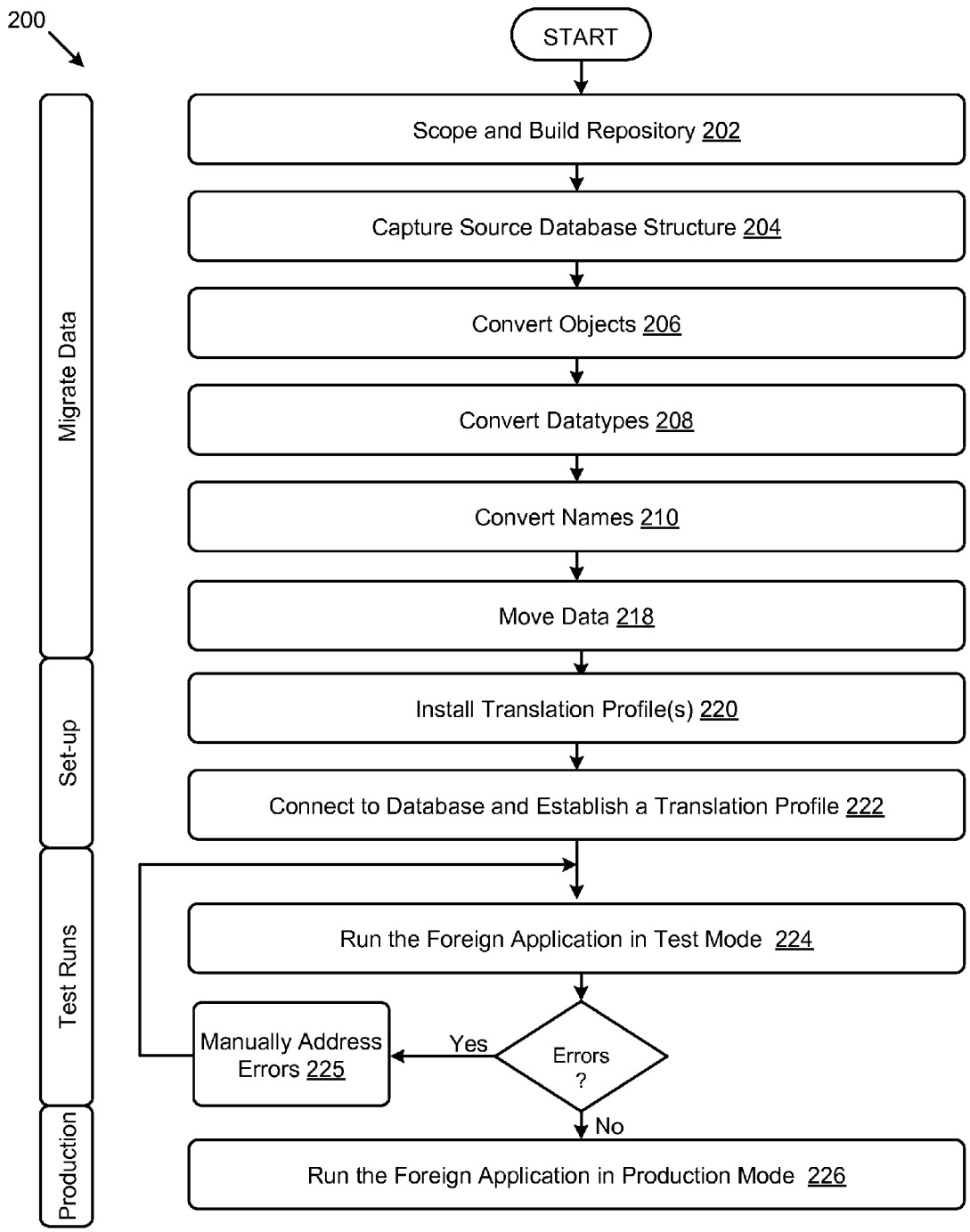
FIG. 2 depicts a step-wise flow for migration of foreign database objects to a native environment in a system for high-performance run-time SQL language translation, according to some embodiments.

FIG. 2 depicts a step-wise flow 200 for migration of foreign database objects to a native environment in a system for high-performance run-time SQL language translation. As an option, the present step-wise flow 200 may be implemented in the context of the architecture and functionality of the embodiments described herein. Also, the step-wise flow 200 or any aspect therein may be implemented in any desired environment.

The step-wise flow 200 comprises several phases, namely a migrate data phase, a set-up phase, a test run phase, and a production run phase. The progression through the step-wise flow 200 is purely exemplary, and other progressions are reasonable and contemplated.

As shown, the step-wise flow 200 commences by scoping and building a repository (see step 202). The scoping task might consider the set of applications to be considered, and then, in turn, might consider what data items need to be migrated. It is sometimes the case that a large database comprising a large amount of data serving the database needs of many applications can be reduced to a smaller set of applications and corresponding data, thus making the migration task smaller. In one flow, aspects and objects (e.g., schema, tables, dependent tables, data types, names, views, etc.) of the source database (e.g., selected from data within the foreign database 114) are captured (see step 204) so as to provide the basis for other migration tasks. The objects are converted (see step 206), as are data types (see step 208), and names (see step 210). Then, having migrated the needed aspects and objects of the foreign environment, the migration phase concludes by moving the converted data (see operation 218). In some cases the terminology and/or formats used in referring to objects in the foreign environment might be referred to differently in the native environment. For example, "procedures" might become "functions", and parameter lists for procedures might differ between the foreign environment and the native environment.

Again referring to the system of FIG. 1B, the migration can take place using the shown database object migration path 116.

Now, in a setup phase, step-wise flow 200 associates components from the foreign environment (e.g., the foreign application) to the native environment by installing one or more translation profiles (see operation 220) and setting one translation profile on the connection (see step 222). In exemplary embodiments, the connection between a foreign application and the native environment is accomplished upon establishment of a session, using a session connection 148, which in turn uses one of the aforementioned profiles (e.g., a translation profile 139, etc.).

Figure 4A:
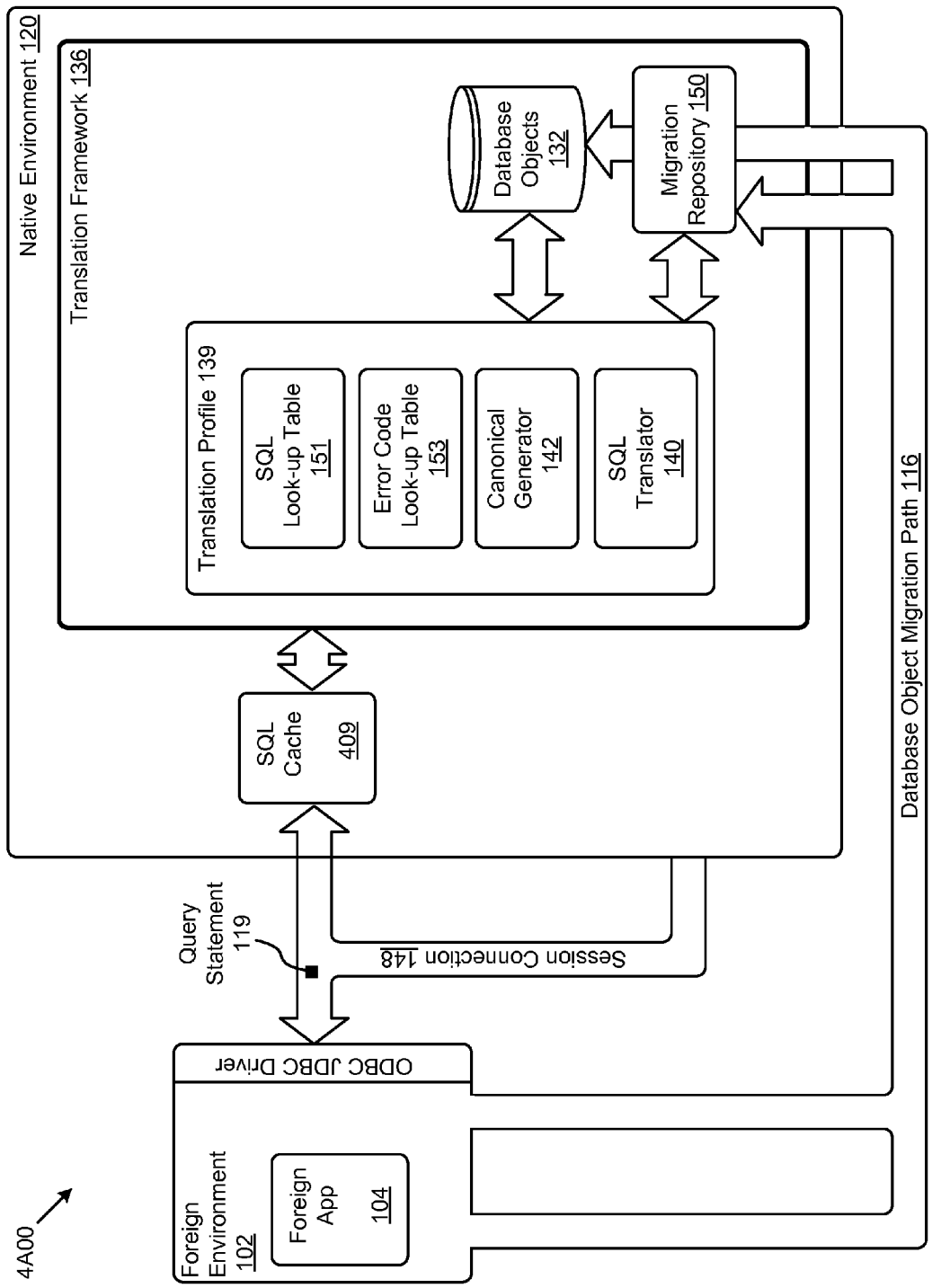
FIG. 4A depicts the path of a foreign application SQL call to a native database, through the SQL translation profile, according to some embodiments.
Figure 4B:
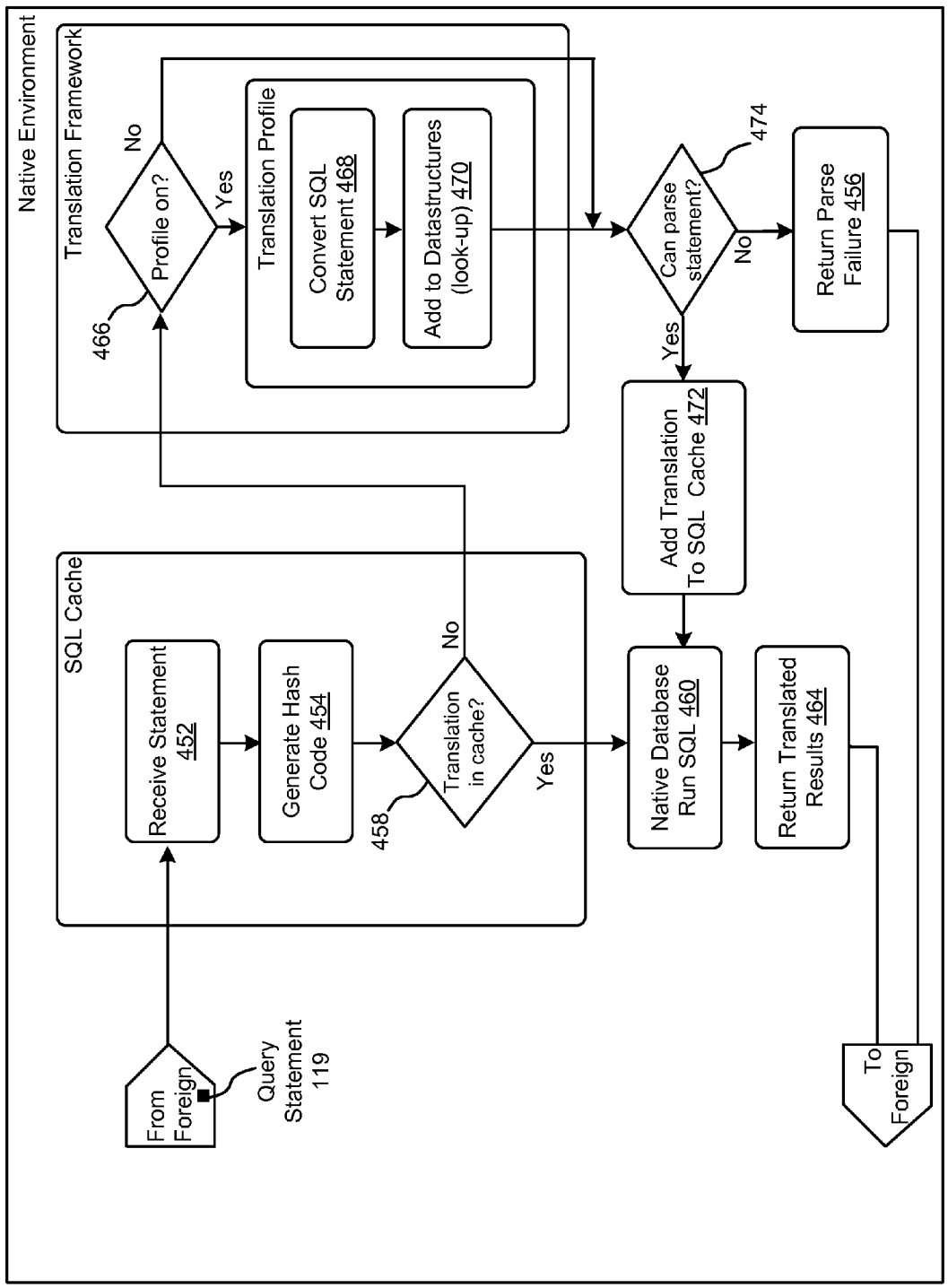
FIG. 4B depicts a translation framework module in cooperation with a caching subsystem as used in systems for high-performance run-time SQL language translation, according to some embodiments.

A phase for test runs is entered, and the foreign application is run in a test mode (see operation 224, also see decision 466 in FIG. 4B). Errors, if any, are reported to the user for manual remediation (see operation 225 in FIG. 2). Such errors might be translation errors or might be data resolution errors, or might be SQL language parse errors. In any of the aforementioned cases, and more, the errors, if any are reported to the user, and the user might modify data structures used in the migration and or translation. Strictly as one example, the user might modify entries in a look-up table (see FIG. 3).

During the migration and test run phases of the application migration project, running the foreign application through a series of test cases would have the effect of populating the look-up-table with all the foreign applications' query statements. This would have the further effect that translation issues can be addressed manually so as to populate data structures for automatic translation and/or for canonical translation.

After customer acceptance, the SQL translation profile can be moved into production and the translator can be disabled. Thus, only the SQL language constructs defined in the look-up table will be executed; any occurrence of a hitherto untranslated SQL language construct will throw an error. The hitherto untranslated statements will be saved in the look-up table for later uses (e.g., manually review, translation, and enabling of the item). Over time a corpus of translation issues are addressed (e.g., manually), during which time the act of addressing the translation issues serves to populate data structures for use in automatic translation. Strictly as an example, the SQL Cache 409 of FIG. 4A creates a hash of a source statement and a respective value which will become the translated statement. Over a period of operation, statements are cached in the SQL Cache 409. In effect, as pertaining to performance, issuing foreign SQL in a native database produces native statements that perform in the same way, and with the same performance as if they had originally been written in the native platform and executed natively. Related techniques are further disclosed in the discussions of FIG. 4B and FIG. 5.

When the application is deemed to run without occurrences of the aforementioned errors, then the user can deem the migration as sufficiently complete so as to facilitate running in a production mode (see setup 226). In a production mode, caching and other performance-enhancing features are turned on-so as to facilitate high-performance operation of the foreign application, even though all or substantially all database SQL language constructs go through the translation framework.

Other Flows

The foregoing flow descriptions can be performed without modifications to the foreign application. However it is possible, and sometimes expeditious, to modify the foreign application to explicitly connect directly to the native database objects via opening database connections.

FIG. 3 exemplifies a look-up table 300 used in systems for high-performance run-time SQL language translation. As an option, the present look-up table 300 may be implemented in the context of the architecture and functionality of the embodiments described herein. Also, the look-up table 300 or any aspect therein may be implemented in any desired environment.

As shown, the look-up table 300 comprises a left side template (e.g., Source Canonical Template) and a right side template (e.g., Target Canonical Template). The left side templates are compared to the incoming query statements, and if a match is found, the right side template is used as the translation for that portion of the statement. Various techniques are used to reduce or eliminate the occurrence of false positives (e.g., where case sensitivity failed to be considered) or to reduce or eliminate the occurrence of missed matches. In some cases, a match need not be a perfect match, but can nonetheless be deemed as a match if certain uniquely identifying characteristics are found in the compared lexical objects of the compared statements.

Other techniques beyond matching statements based on look-up in a canonical table can be implemented. For example, a look-up table 300 can be used in conjunction with any forms of the aforementioned migration repository 150. Another technique involves adding statements to the profile manually so that they match the source canonical template.

FIG. 4A depicts a flow 4A00 including the path of a foreign application SQL call to the native database, through the SQL translation profile. As shown, the foreign application 104 runs in the foreign environment 102, and communicates with the native environment 120 via a session connection 148. A stream of query statements are sent over the session connection 148, which has had a translation profile applied to it, destined for the translation framework 136. Also, the foreign application 104 runs in the foreign environment, and receives responses and return codes (e.g., error codes) from the native environment via the session connection. In particular, the return codes from the native environment can be translated into corresponding return codes in the native environment using the Translation Profile 139 Error Code Look-up Table 153. A look-up table or other form of mappings can be performed within the Translation Profile 139.

FIG. 4B depicts a translation framework module in cooperation with a caching subsystem as used in systems for high-performance run-time SQL language translation, according to some embodiments.

As shown, it is possible that a new query statement is received (see operation 452), and the new query can be looked-up in a translation cache. For fast look-up, a hash code might be generated for the incoming query statement (see operation 454), and the hash code compared with hash codes of previously cached query statements. In the event that the new incoming query statement is not in the translation cache (see decision 458), then it would need to be translated (e.g., using a SQL translation profile). In such a case, processing proceeds to decision 466, which tests if the profiling option is enabled. If not, this throws an error (see operation 456). Otherwise, the SQL translation profile is entered, which constituent operations serve to translate the query (see operation 468), and add to the relevant datastructures (see operation 470). The translated statement is sent to a parser, and if the parser can successfully parse the translated statement (see test 474), then it can be added to the SQL Cache 409 (see operation 472), whereupon processing continues by running the translated statement (see operation 460).

As indicated in the foregoing, decision 466 tests if the profiling option is enabled. If not, control proceeds directly to the database SQL parser. If the database SQL parser returns a code based on the success (or failure) of parsing the SQL statement, and based on the return code, the system returns results (see operation 464) in the same manner as if the profiler were not present or enabled. It is possible the that incoming statement was not translated (e.g., because the profiler was turned off) and thus it is possible than the incoming statement was unparsable, thus emitting an parse failure error (see operation 456).

Figure 5:
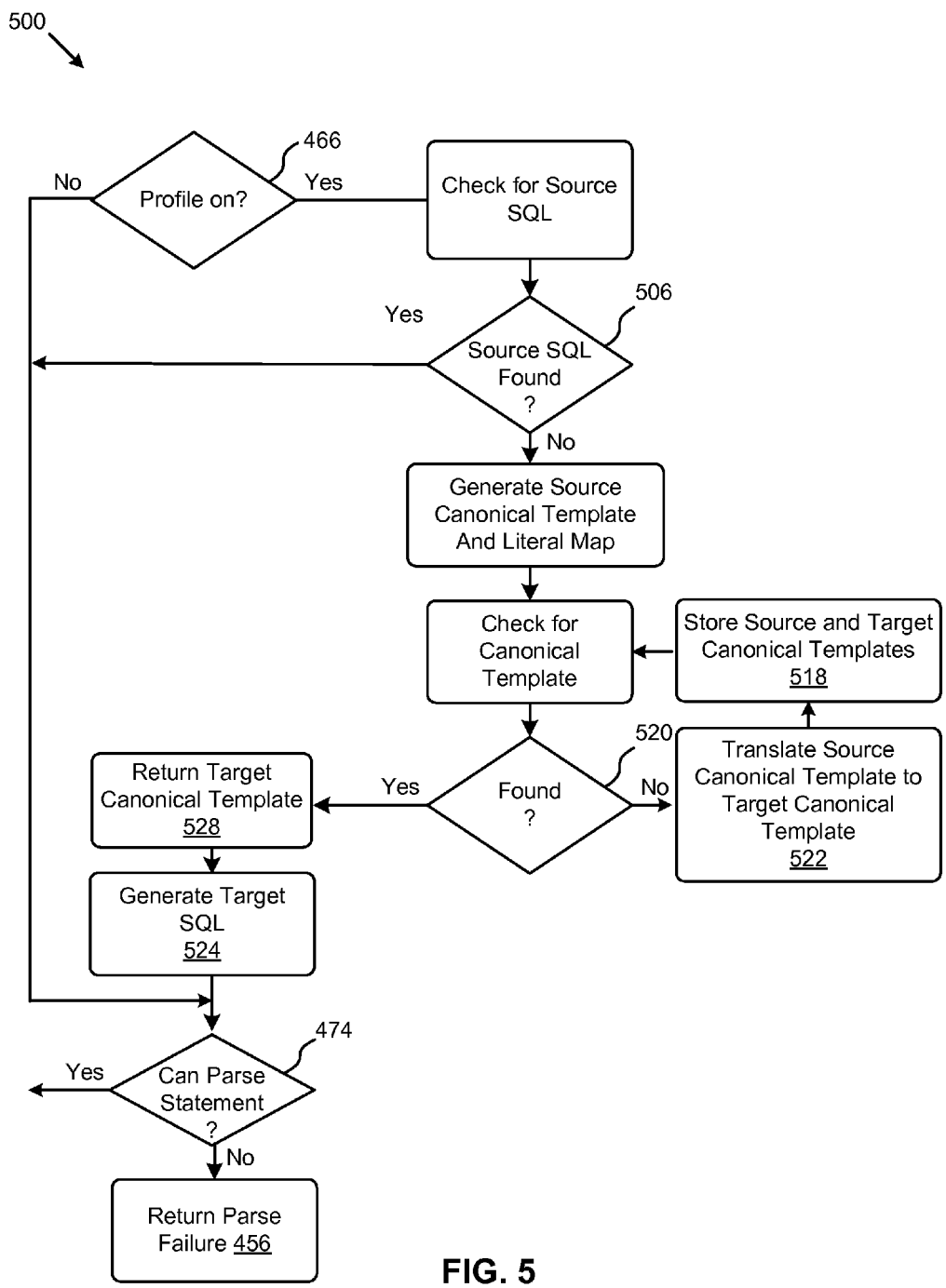
FIG. 5 depicts logic within a SQL translation profile used in systems for high-performance run-time SQL language translation, according to some embodiments.

FIG. 5 depicts logic 500 within a canonical generator used in systems for high-performance run-time SQL language translation. As an option, the present logic 500 may be implemented in the context of the architecture and functionality of the embodiments described herein. Also, the logic 500 or any aspect therein may be implemented in any desired environment.

As shown, the logic commences at decision 466 to determine if profiling is "ON" (e.g., a translation profile is established and enabled in the connection profile). If so, the given SQL statement is checked against source SQL from among any static translations, possibly using a SQL Lookup Table. If a corresponding static translation is found (see decision 506), then it is returned unmodified.

In some cases, when the given SQL statement is checked against static translations and no static translation is found, then procedures for parsing and generating and storing a Source Canonical Template and literals map are commenced (see operation 522 and operation 518).

When a source canonical template corresponding to the given query statement is found (see test 520) then the corresponding Target Canonical Template (see operation 528) is scanned in order to replace the literals to generate the Target SQL Statement (see operation 524) and the translated SQL statement then becomes the subject of a query parser (see test 474). For example, if an identifier tag such as "<ORA:LITERAL TYPE=INT ID=1>" is found, it is replaced with the literal 10 (see Table 2). In this manner, the system serves for translating foreign query statements comprising a foreign literal value by replacing the foreign literal value with a native lookup expression.

Additional Embodiments of the Disclosure

Figure 6:
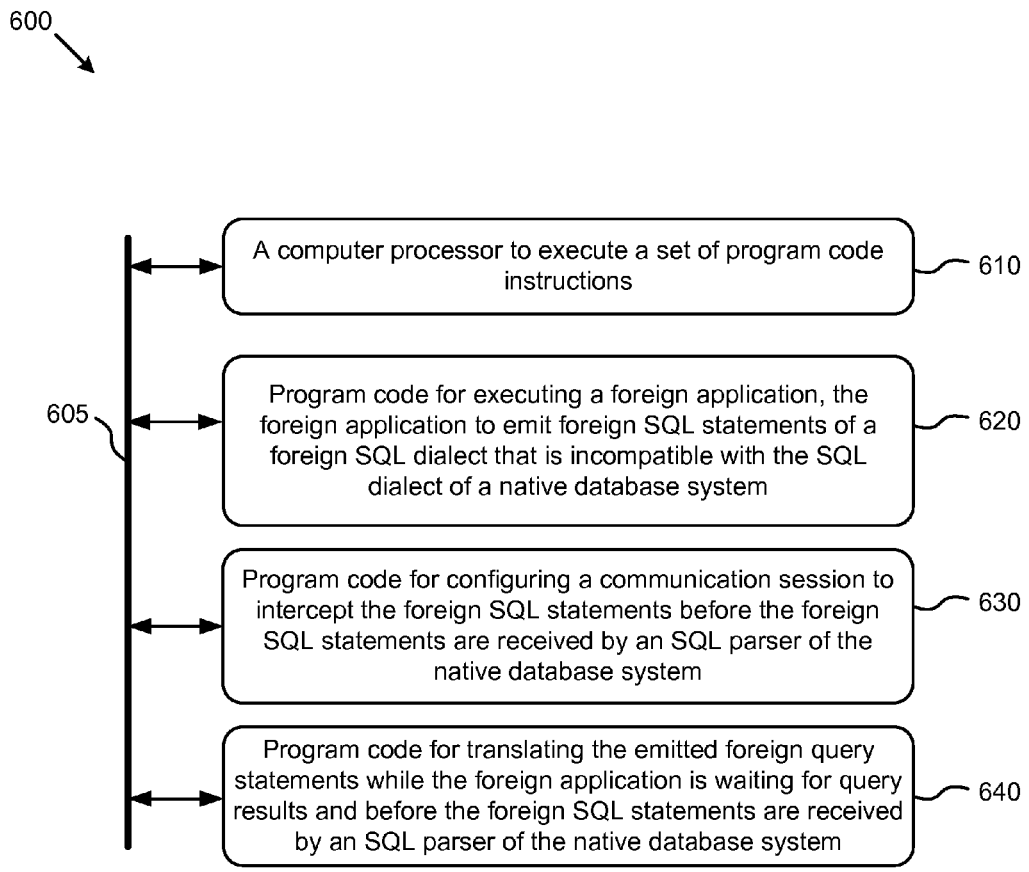
FIG. 6 is a block diagram of a system for high-performance run-time SQL language translation, according to some embodiments.

FIG. 6 is a block diagram of a system for high-performance run-time SQL language translation. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: executing a foreign application, the foreign application to emit foreign SQL statements of a foreign SQL dialect that is incompatible with the SQL dialect of a native database system (see module 620); configuring a communication session to intercept the foreign SQL statements before the foreign SQL statements are received by an SQL parser of the native database system (see module 630); and translating the emitted foreign query statements while the foreign application is waiting for query results and before the foreign SQL statements are received by an SQL parser of the native database system (see module 640). The translation of the emitted foreign query statement might be done since the emitted foreign query statement had not been previously translated, or it might be translated using a cache (possibly using a look-up table, and possibly using a hash code).

System Architecture Overview

Figure 7:
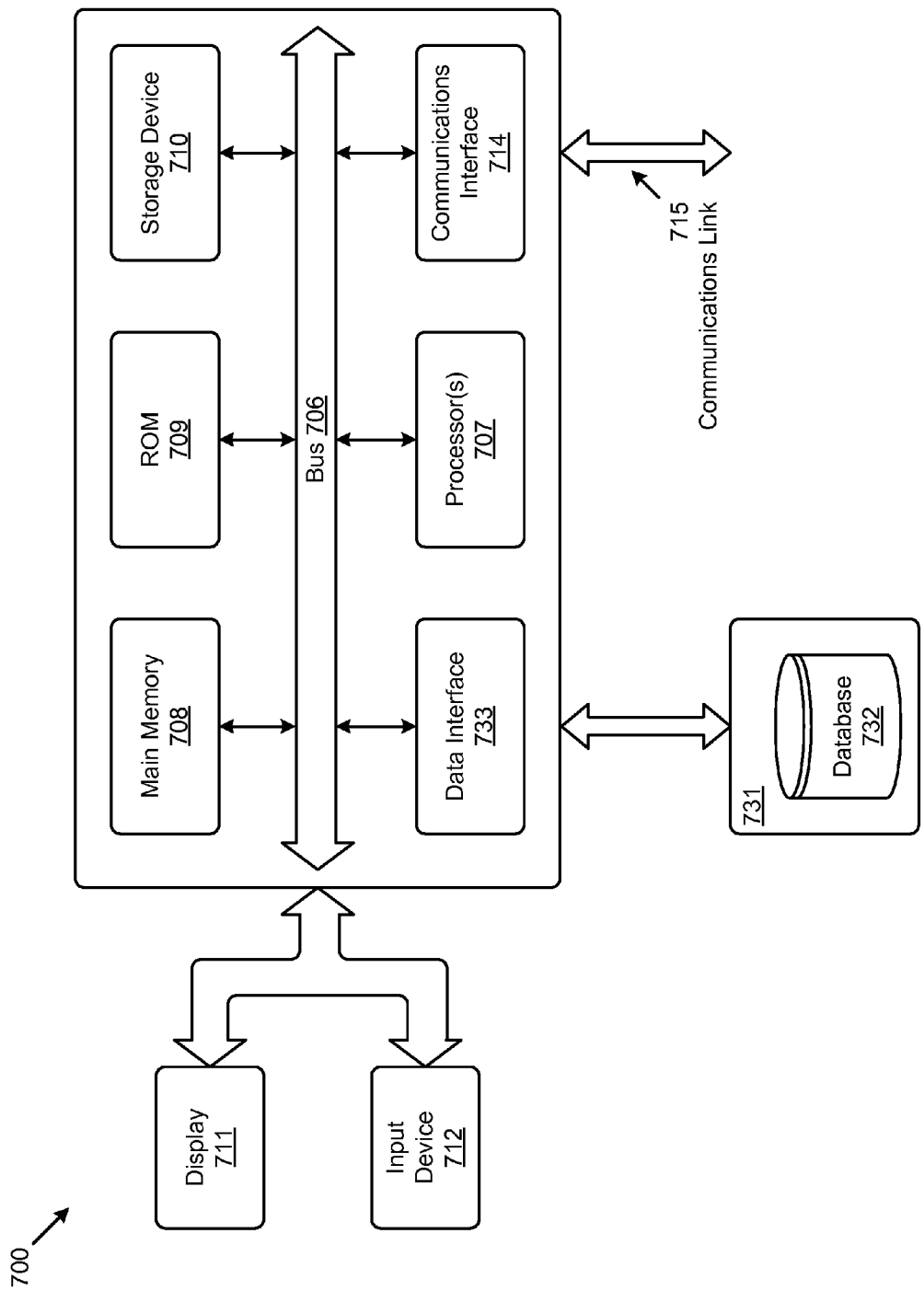
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for run-time SQL language translation, the method comprising:
   receiving, from an application, a query for execution, the query comprising dynamically generated SQL, the query being constructed in a foreign SQL dialect that is incompatible with a native SQL dialect of a native database system, wherein the dynamically generated SQL is constructed at run-time by the application; and
   performing real-time translation of the query from the foreign SQL dialect into the native SQL dialect, in which the query is intercepted to perform the real-time translation and the query is translated prior to returning results of the query to the application, wherein performing real-time translation of the dynamically generated SQL comprises:
   excluding literal values from the dynamically generated SQL;
   performing pattern matching on portions of the dynamically generated SQL excluding the literal values;
   identifying one or more canonical templates corresponding to the portions of the dynamically generated SQL excluding the literal values;
   translating the dynamically generated SQL excluding the literal values from the foreign SQL dialect into the native SQL dialect using the one or more canonical templates to generate a translated SQL; and
   inserting the literal values that were excluded from the dynamically generated SQL into the translated SQL.

2. The method of claim 1, further comprising translating a return code from the native database system to return to the application.

3. The method of claim 1, further comprising configuring a database session connection to intercept the query and to establish a translation profile.

4. The method of claim 1, wherein
   the one or more canonical templates corresponding to the dynamically generated SQL excluding the literal values are identified from a look-up table.

5. The method of claim 1, further comprising performing a lookup operation using a SQL lookup table.

6. The method of claim 1, wherein the one or more canonical templates are created by:

generating a source canonical template corresponding to the dynamically generated SQL excluding the literal values and a literals map corresponding to the literal values that were excluded from the dynamically generated SQL;

translating the source canonical template into a target canonical template, the target canonical template being in the native SQL dialect and having literal expressions mapped in the literals map; and storing the source canonical template, the literals map, and the target canonical template in a look-up table for subsequent occurrences of other dynamically generated SQL statements having similar patterns.

7. The method of claim 1, wherein translating the query from the foreign SQL dialect comprises replacing a foreign literal value with a native lookup expression, wherein the foreign literal value is available only at run-time.

8. The method of claim 1, further comprising replacing a native error code with a foreign error code.

9. A computer system for run-time SQL language translation, comprising:
- a computer processor to execute a set of program code instructions; and
- a memory to hold the set of program code instructions, in which the set of program code instructions comprises program code to perform:
  - receiving, from an application, a query for execution, the query comprising dynamically generated SQL, the query being constructed in a foreign SQL dialect that is incompatible with a native SQL dialect of a native database system, wherein the dynamically generated SQL is constructed at run-time by the application; and
  - performing real-time translation of the query from the foreign SQL dialect into the native SQL dialect, in which the query is intercepted to perform the real-time translation the query is translated prior to returning results of the query to the application, wherein performing real-time translation of the dynamically generated SQL comprises: excluding literal values from the dynamically generated SQL; performing pattern matching on portions of the dynamically generated SQL excluding the literal values; identifying one or more canonical templates corresponding to the portions of the dynamically generated SQL excluding the literal values; translating the dynamically generated SQL excluding the literal values from the foreign SQL dialect into the native SQL dialect using the one or more canonical templates to generate a translated SQL; and inserting the literal values that were excluded from the dynamically generated SQL into the translated SQL.

10. The computer system of claim 9, further comprising program code for translating a return code from the native database system to return to the application.

11. The computer system of claim 9, further comprising program code for configuring a database session connection to intercept the query and to establish a translation profile.

12. The computer system of claim 9, wherein
the one or more canonical templates corresponding to the dynamically generated SQL excluding the literal values are identified from a look-up table.

13. The computer system of claim 9, further comprising program code for performing a lookup operation using a SQL lookup table.

14. The computer system of claim 9, wherein the one or more canonical templates are created by:

generating a source canonical template corresponding to the dynamically generated SQL excluding the literal values and a literals map corresponding to the literal values that were excluded from the dynamically generated SQL;

translating the source canonical template into a target canonical template, the target canonical template being in the native SQL dialect and having literal expressions mapped in the literals map; and storing the source canonical template, the literals map, and the target canonical template in a look-up table for subsequent occurrences of other dynamically generated SQL statements having similar patterns.

15. The computer system of claim 9, wherein translating the query from the foreign SQL dialect comprises replacing a foreign literal value with a native lookup expression, wherein the foreign literal value is available only at run-time.

16. The computer system of claim 9, further comprising program code for replacing a native error code with a foreign error code.

17. A computer program product embodied in a non-transitory computer readable medium, the non-transitory computer readable medium having stored thereon a sequence of instructions which, when executed by a processor causes the processor to execute a process to implement real-time SQL language translation, the process comprising:
- receiving, from an application, a query for execution, the query comprising dynamically generated SQL, the query being constructed in a foreign SQL dialect that is incompatible with a native SQL dialect of a native database system, wherein the dynamically generated SQL is constructed at run-time by the application; and
- performing real-time translation of the query from the foreign SQL dialect into the native SQL dialect, in which the query is intercepted to perform the real-time translation and the query is translated prior to returning results of the query to the application, wherein performing real-time translation of the dynamically generated SQL comprises: excluding literal values from the dynamically generated SQL; performing pattern matching on portions of the dynamically generated SQL excluding the literal values; identifying one or more canonical templates corresponding to the portions of the dynamically generated SQL excluding the literal values; translating the dynamically generated SQL excluding the literal values from the foreign SQL dialect into the native SQL dialect using the one or more canonical templates to generate a translated SQL; and inserting the literal values that were excluded from the dynamically generated SQL into the translated SQL.

18. The computer program product of claim 17, further comprising instructions for translating a return code from the native database system to return to the application.

19. The computer program product of claim 17, further comprising instructions for configuring a database session connection to intercept the query and establishing a translation profile.

20. The computer program product of claim 17, wherein
the one or more canonical templates corresponding to the dynamically generated SQL excluding the literal values are identified from a look-up table.

21. The computer program product of claim 17, further comprising program code for performing a lookup operation using a SQL lookup table.

22. The computer program product of claim 17, wherein the one or more canonical templates are created by:
- generating a source canonical template corresponding to the dynamically generated SQL excluding the literal values and a literals map corresponding to the literal values that were excluded from the dynamically generated SQL;
- translating the source canonical template into a target canonical template, the target canonical template being in the native SQL dialect and having literal expressions mapped in the literals map; and
- storing the source canonical template, the literals map, and the target canonical template in a look-up table for subsequent occurrences of other dynamically generated SQL statements having similar patterns.

23. The computer program product of claim 17, wherein translating the query from the foreign SQL dialect comprises replacing a foreign literal value with a native lookup expression, wherein the foreign literal value is available only at run-time.

* * * * *

UNITED STATES PATENT AND TRADEMARK OFFICE
CERTIFICATE OF CORRECTION

PATENT NO. : 9,582,500 B2  
APPLICATION NO. : 13/831794  
DATED : February 28, 2017  
INVENTOR(S) : McGillin et al.

Page 1 of 1

It is certified that error appears in the above-identified patent and that said Letters Patent is hereby corrected as shown below:

In the Drawings

On sheet 7 of 10, in FIG. 4B, under Reference Numeral 470, Line 1, delete "Datastructures" and insert -- Data structures --, therefor.

In the Specification

In Column 10, Line 16, delete "and or" and insert -- and/or --, therefor.

In Column 11, Lines 58-59, delete "datastructures" and insert -- data structures --, therefor.

In Column 12, Line 4, delete "the that" and insert -- that the --, therefor.

In Column 13, Line 63, delete "PTSN," and insert -- PSTN, --, therefor.

In the Claims

In Column 15, Line 1, in Claim 6, delete "template" and insert -- templates --, therefor.

In Column 15, Line 37, in Claim 9, after "translation" insert -- and --.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*